United States Patent [19]
Peterson

[11] Patent Number: 5,269,869
[45] Date of Patent: Dec. 14, 1993

[54] TAPE LAYING APPARATUS
[75] Inventor: David A. Peterson, Milford, Ohio
[73] Assignee: Cincinnati Milacron Inc., Cincinnati, Ohio
[21] Appl. No.: 17,615
[22] Filed: Feb. 12, 1993
[51] Int. Cl.$^5$ .................. B32B 31/00; B65H 26/00
[52] U.S. Cl. ............................. 156/361; 156/574; 156/488
[58] Field of Search ............ 156/574, 523, 488, 583.1, 156/583.4; 53/370.7, 373.3, 373.7, 375.9

[56] References Cited
U.S. PATENT DOCUMENTS
4,954,204 9/1990 Grimshaw ..................... 156/361

OTHER PUBLICATIONS
Advanced Composites 1993 Bluebook, Nov./Dec. 1992, Part II of II.

Primary Examiner—David A. Simmons
Assistant Examiner—M. Curtis Mayes
Attorney, Agent, or Firm—Thomas M. Farrell; Donald Dunn

[57] ABSTRACT

An improved plastic tape laying machine is provided having a spring driven spool rotationally mounted on a stationary shaft and being coupled to a flexible skid member interposed between a presser member of a tape laying head of the machine and the plastic tape being applied to a work surface. The spool applies a movement restraining force to the skid member that restricts or prevents undesired movements of the skid that lead to misalignment, delamination and other defects in a produced plastic composite article while at the same time biasing the skid against the tape detruding portion of the presser member without significantly inhibiting the working motions of the presser member.

7 Claims, 6 Drawing Sheets

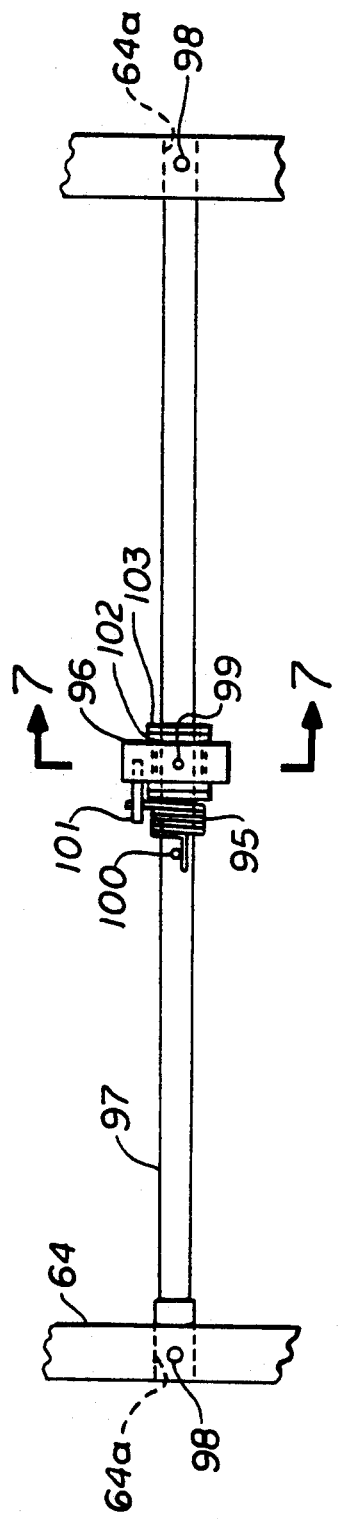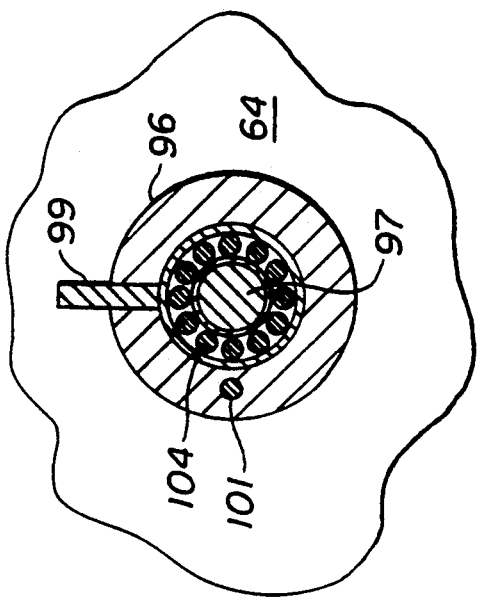
FIG. 6
FIG. 7

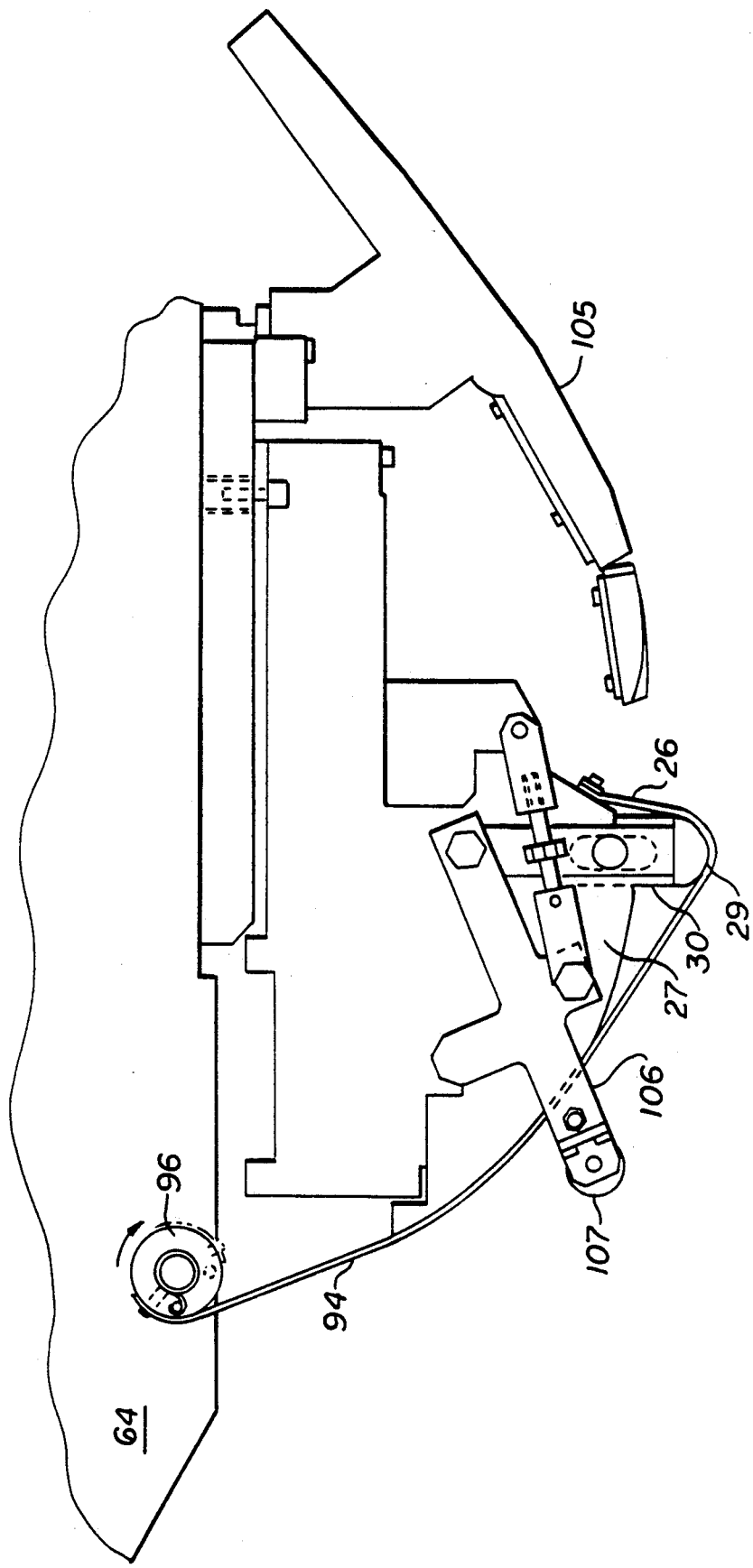

TAPE LAYING APPARATUS

FIELD OF INVENTION

This invention pertains to apparatus for laying plastic tape to create laminated structures, often referred to as reinforced composites. Such apparatus employ a presser member (e.g. a roller or skidding shoe) to detrude laminar plies of tape onto a work surface, generally a contoured work surface.

BACKGROUND OF THE INVENTION

Tape laying machines for producing reinforced composite plastic structures have a tape laying head, usually oriented around the tape laying path, that includes a presser member contacting the tape for applying force against the tape to detrude the tape onto the work surface while following the changing contour of the work surface. Such a tape laying machine and more specifically a presser member is described in U.S. Pat. No. 4,954,204 assigned to the assignee of this application, the entire disclosure of which is incorporated herein by reference.

The tape is customarily a thermosetting or thermoplastic resin film often having fibrous (e.g. glass or carbon) reinforcement embedded therein. Such tape is applied to the work surface, usually a contoured mold surface, by a presser member, with some amount or pressure of force, in layers that are subsequently further consolidated, often with heat and pressure.

More recent designs of tape laying equipment, for making composite structures, employ segmented shoes in the presser member. These segmented shoes, which employ a plurality of individually movable blades or rollers have the advantage of improved conformation of the tape to the work surface, especially when simultaneous multiaxial changes in contour occur on the work surface. To further improve the performance of these segmented shoes it is known to use a flexible skid member between the shoe and the tape.

In applying the tape to the work surface it is known in the art to cause the tape, usually having a layer of paper on the one surface, to pass beneath, i.e. slide against, the flexible skid member, with the paper surface contacting the skid, while the movable components (i.e. blades or rollers) of the segmented shoe are pressing against the skid and thus the tape. The skid is attached at one end to a solid section of the presser member and at least equal to the width of the tape being employed. Passage of the tape along the bottom of the flexible skid member often does not produce undesirable movement, particularly lateral movement, of the membrane or skid. However, under certain conditions during the laying of the tape lateral motions of the flexible skid member can be and are experienced which produce undesirable shifting of a layer of tape with respect to the layer below and/or the work surface and other defects in the laminated structure of the molding. Shifting or bunching of the tape is especially vulnerable to occur when beginning the application of a new course or layer of tape over an existing layer of tape on the work surface or during laying a adjacent runs of tape. During such an operation the free end of the flexible skid member may move vertically and/or laterally while the presser member is being positioned for laying the next course of tape. As a consequence of such vertical and/or lateral motion the flexible skid member may not be in its proper position for laying the next course of tape. Such a condition can and does cause the tape to misalign or bunch up at the start of the course and results alignment and/or delamination defects in the composite structure. Thus, it is highly desirable to prevent undesirable motion of the flexible skid member of the presser member of the tape laying apparatus, while at the same time not restricting the advantageous and necessary motions of the presser member, particularly the blade or roller segment of the segmented shoe.

BRIEF DESCRIPTION OF THE DRAWINGS

FIG. 6 is a plan view of the retractor improvement shown in FIG. 5.

FIG. 7 is an elevational section taken along line 7—7 of FIG. 6.

FIG. 8 is a schematic view of an alternate embodiment of this invention.

SUMMARY OF THE INVENTION

It is an object of this invention to provide an improved presser member that has increased resistance to causing misalignment and delamination defects in a composite laminated plastic structure produced during the operation of a plastic tape laying apparatus.

It is an another object of this invention to provide an improved plastic tape laying apparatus with increased resistance to producing a plastic composite structure having misalignment and/or delamination defects.

It is a further object of this invention to provide an improved tape laying head having a presser member with a free end flexible skid member and having a means attached to said end for imparting movement restricting force to the flexible skid member.

This invention is shown embodied in a tape laying machine for applying fibrous reinforced plastic tape onto a work surface, for example a mold, where the machine has an improved head movable on a base frame in response to a means for controlling the movement of the head along plural axis with respect to the work surface while applying the tape to the surface, wherein the improved head comprises:

1) a presser member affixable to the head, said member comprising a housing and a floating end flexible skid member affixed at one end to the housing and disposed between said presser member and the plastic tape and 2) a means coupled to the floating end of the flexible skid member for applying a movement restricting force to said skid while biasing the skid against the presser member in a manner permitting the working motions of the presser member said means comprising a controllable force generating means and a coupling means for engaging said skid.

DESCRIPTION OF THE PREFERRED EMBODIMENT

Figure 1:
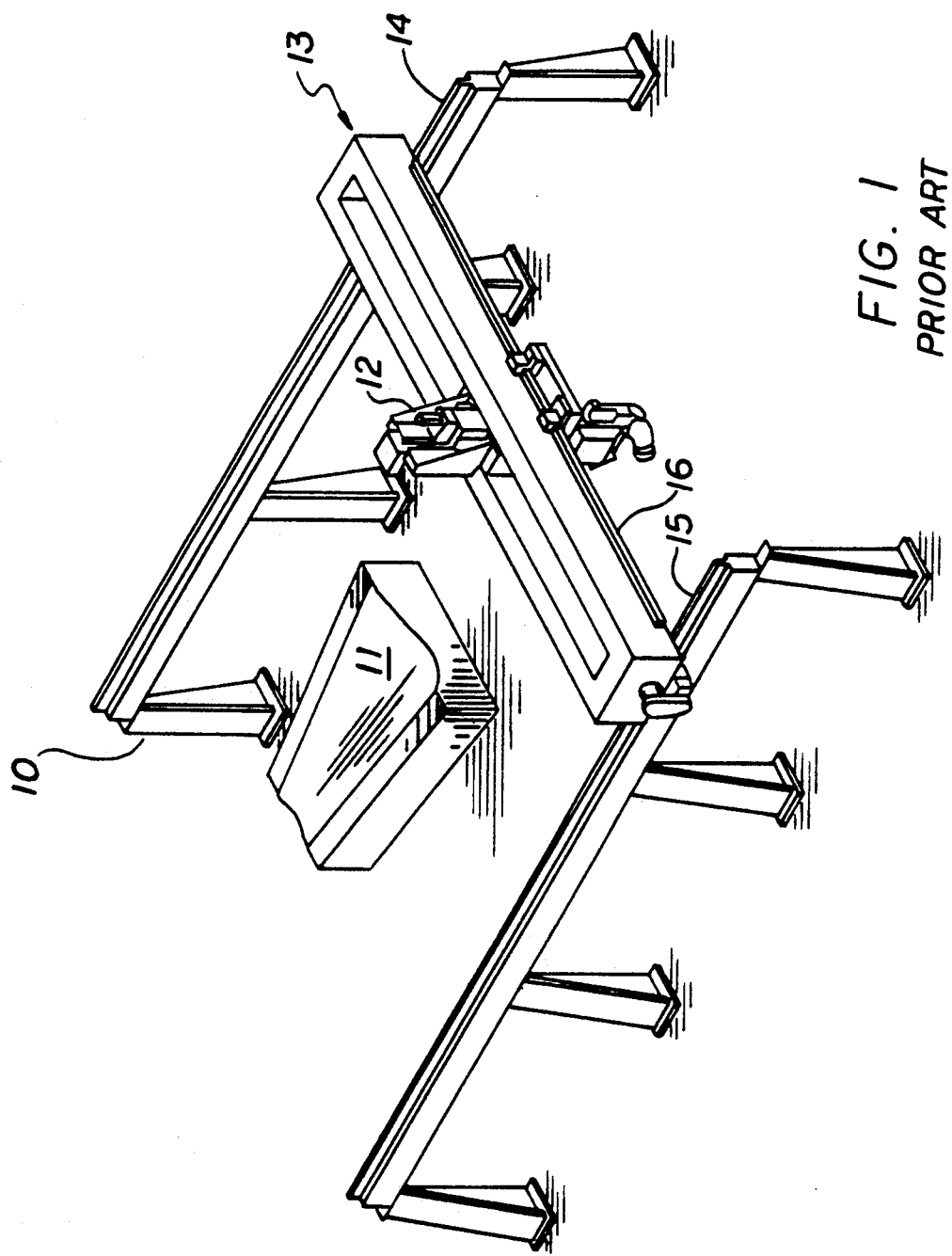
FIG. 1 is a perspective view of a tape laying machine of the prior art.

In FIG. 1 there is depicted a prior art high rail gantry type tape laying machine 10, positioned around a contoured mold 11, which comprises a multi axis positionable tape laying head 12 that is supported on gantry 13 and is transported coordinately on side rails 14 and 15 and gantry rails 16 for laying down plastic tape on the contoured surface of mold 11 to form a composite structure.

Figure 2:
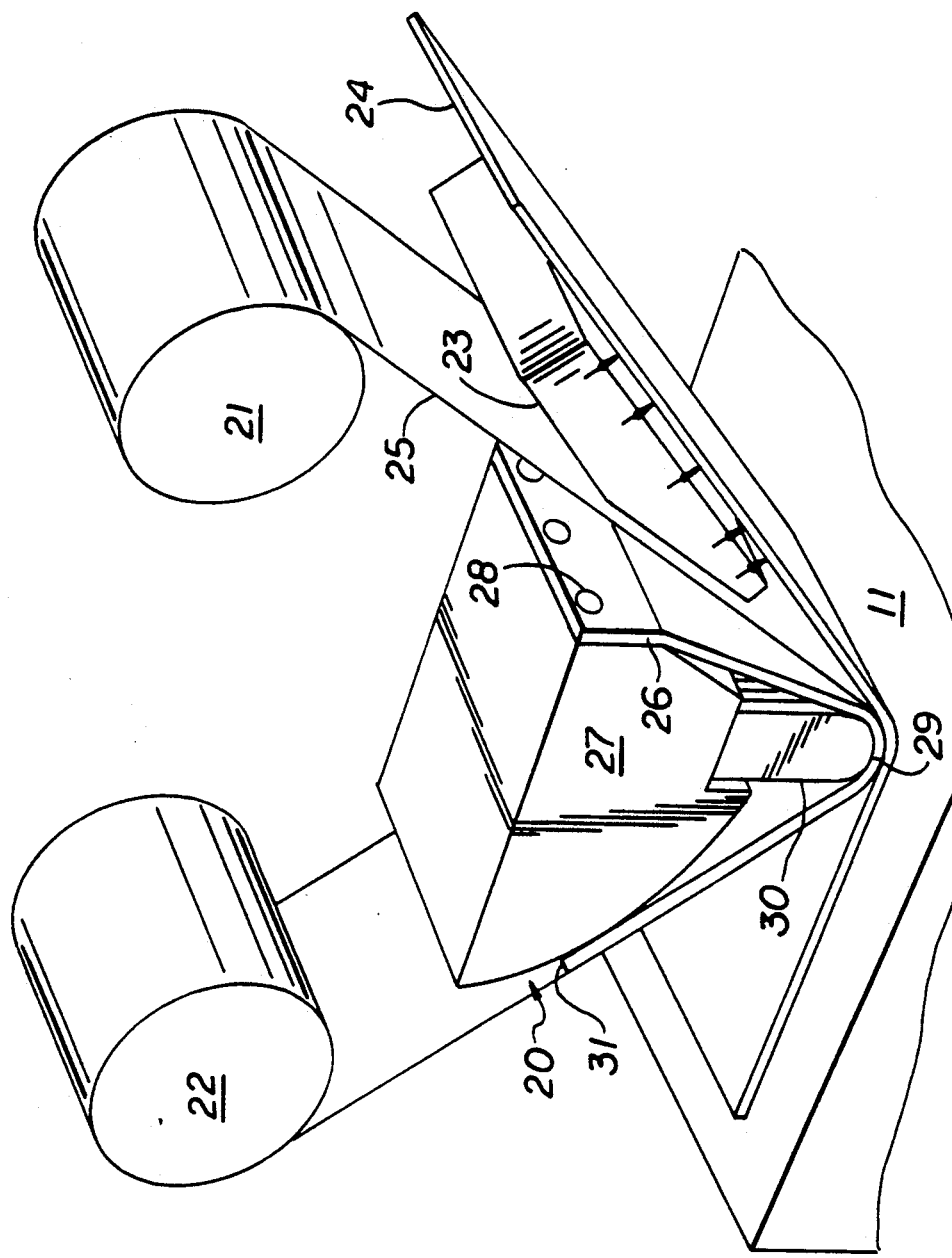
FIG. 2 is a perspective view of a prior art presser member of a tape laying machine with associated source of tape, a paper backing take up roll and tape heater.

The perspective view in FIG. 2 illustrates a prior art presser member 20 along with associated paper backing supply roll 21, paper backing take up roll 22, heater 23 and mold 11. Plastic tape 24 is passed under heater 23 to soften the tape for detruding it onto the contoured surface of mold 11. After passing under heater 23 tape 24 is joined with paper 25 from supply roll 21 and passed beneath flexible skid member 26, fixed at one end to housing 27 of presser member 20 by screws 28. Flexible skid member 26, paper 25 and plastic tape 24 are passed beneath and engage the bottom edge or nose 29 of segmented shoe plate stack 30 supported in housing 27 for detrusion of plastic tape 24 on to the contoured surface of mold 11 to form a composite structure. Flexible skid member 26 has a free end 31 over which paper 25 passes.

Figure 3:
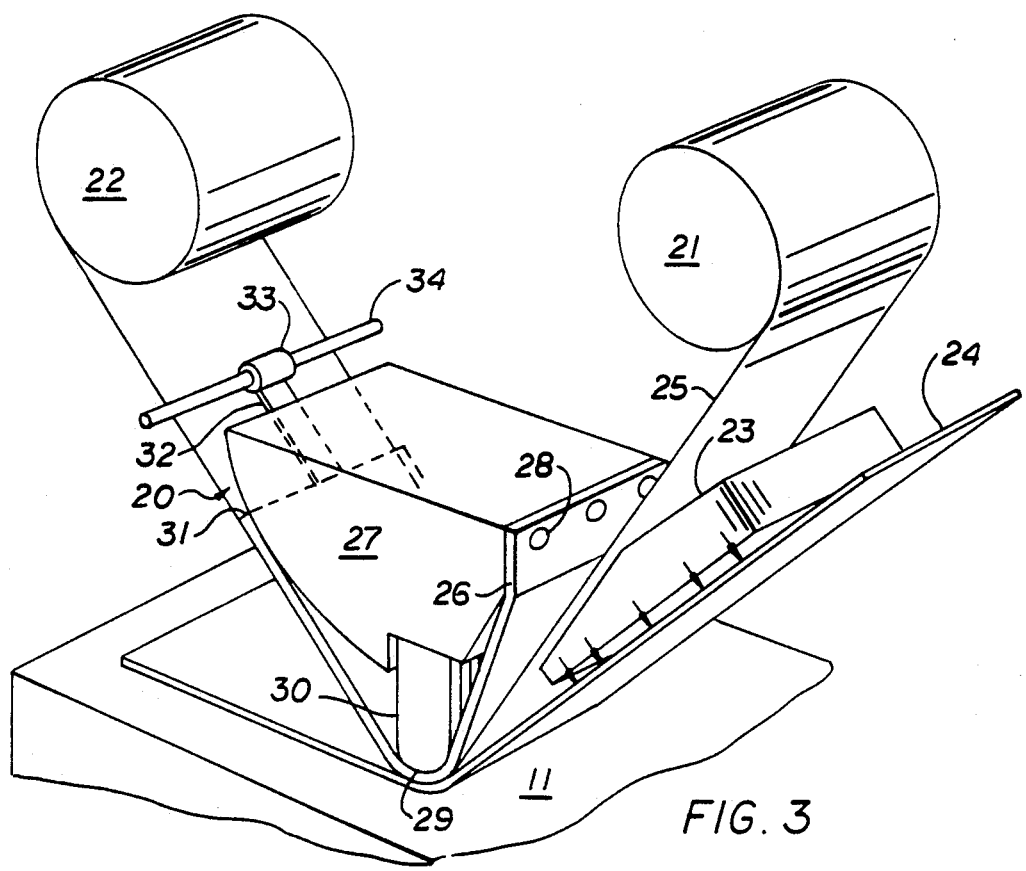
FIG. 3 is a perspective view of an improved presser member embodiment of this invention for laying thermoplastic tape.

An embodiment of this invention is depicted in the perspective view shown in FIG. 3 wherein there is shown a presser member 20 for detruding plastic tape 24 (e.g. a fiber reinforced thermoplastic tape) on to the contoured surface of mold 11. Tape 24, from a supply roll, not shown, is passed under heater 23 to heat the tape to a working condition and then joined with paper 25, from paper supply roll 21, is passed under flexible skid member 26, fixed at one end to housing 27 of presser member 20 by screws 28. The paper 25 contacts the flexible skid member 26 forming a sandwich of flexible skid member 26, paper 25 and plastic tape 24 that goes underneath and contacts the bottom edge or nose 29 of the segmented shoe plates stack 30 movably supported in housing 27 of presser member 20 so as to detrude plastic tape 24 onto the contoured surface of mold 11. Paper 25 then passes along flexible skid member 26 for a short distance after leaving tape 24 and is taken up by take up roll 22. The free end 31 of flexible skid member 26 is coupled by strap 32 to a retractor comprising a torsion spring driven rotatable spool 33 mounted on stationary shaft 34 so as to control movement of free end 31 and to thereby resist or prevent undesired movement of flexible skid member 26 that would produce misalignment, delamination and/or other defects in the composite structure produced with tape 24. In the practice of this embodiment of the invention stationary shaft 34 would be fixed to a suitable rigid member of the tape head structure holding presser member 20 of the tape laying apparatus and strap 32 could be connected to spool 33 by a pin or equivalent means, not shown, and to the flexible skid member 26 by a T shaped end passing through a slot in and engaging free end 31 of flexible skid member 26. Strap 32 could be made from a variety of materials of suitable strength, e.g. nylon, consistent with the strength of flexible skid 26 or flexible skid member 26 may be appropriately formed to directly couple to spool 33. The retractor coupled to a flexible skid member of a presser member, one embodiment of which is shown in FIG. 3, comprises the improvement of this invention. A force is exerted by the retractor on flexible skid member 26 that is just sufficient to keep flexible skid member 26 against nose 29 of segmented shoe plates stack 30 without significantly restricting the movement of the plates of shoe plates stack 30 and at the same time sufficient to restrict or prevent the movement of free end 31 of flexible skid member 26 to thereby restrict or prevent undesirable longitudinal and/or transverse movement of flexible skid member 26 particularly during the initiation of a new row, line or layer of tape laying. To apply such force spool 33 may be manually rotated on shaft 34 to set a torsion spring for placing a coiling force on spool 33, while coupling flexible skid 26 to the retractor via strap 32, and hence flexible skid 26 just sufficient to keep flexible skid member 26 against nose 29 of shoe plate stack 30 without significantly restricting the movement of the shoe plates of shoe plate stack 30 while at the same time placing a force on flexible skid member 26 sufficient to prevent longitudinal and/or transverse movement of flexible skid 26 during the initiation of a detrusion of tape 24 onto the contoured of mold 11.

Figure 4:
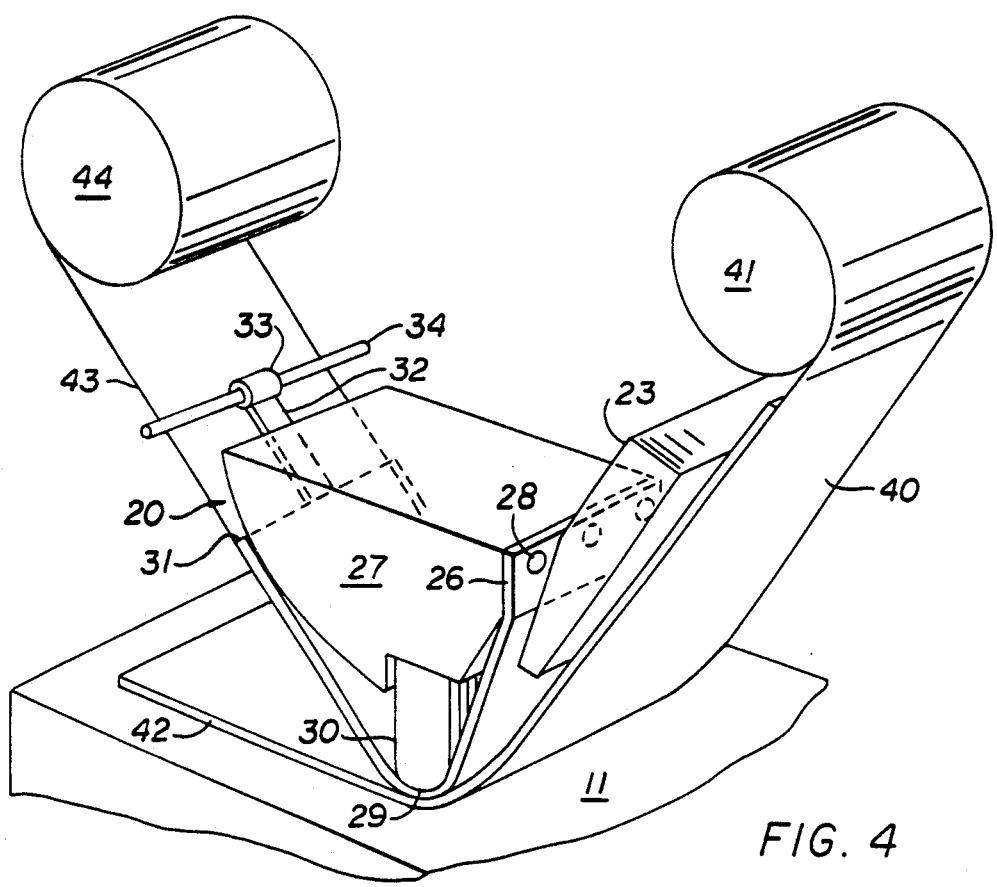
FIG. 4 is a perspective view of an improved presser member embodiment of this invention for laying thermosetting plastic tape.

In FIG. 4 there is presented, in a perspective view, a further embodiment of this invention with respect to the laying of paper backed reinforced thermosetting plastic tape (e.g. a carbon or glass fiber reinforced epoxy resin tape). The apparatus shown in FIG. 4 is similar to that shown in FIG. 3, however the paper backed plastic tape 40 from supply roll 41, is passed under heater 23 with the paper side toward the heater. Therefore, the paper backed tape 24 is passed under and contacts flexible skid member 26 with the paper side contacting flexible skid 26 forming a flexible skid 26, paper 43, plastic tape 42 sandwich that engages nose 29 of segmented shoe plate stack 30 for detruding tape 42 onto the contoured surface of mold 11. Upon detruding tape 42 onto the contoured surface of mold 11 paper 43 separates from tape 42, follows along skid 26 a short distance and is taken up by roll 44. The attachment of flexible skid 26 to presser member 20 and the coupling of flexible skid 26 to the retractor are as described in FIG. 3. The structure and operation of the retractor are also the same as described in FIG. 3.

Figure 5:
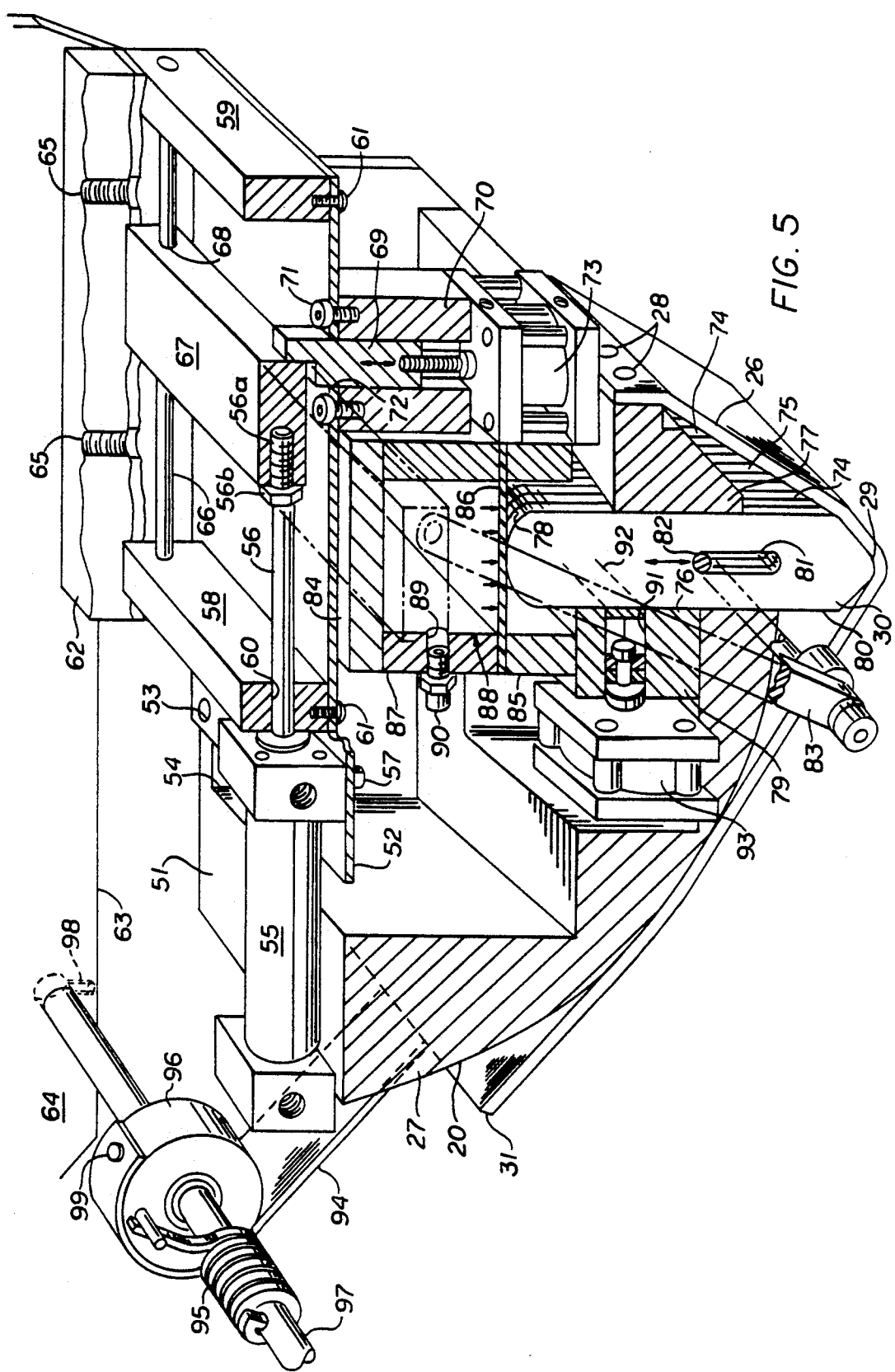
FIG. 5 is a perspective view in section of an improved presser member embodiment of this invention.

There is presented in FIG. 5 a preferred practice of this invention in respect to a more detailed view in partial section on the presser member 20 of FIG. 3 and FIG. 4 and the retractor. Housing 27 is quarter rounded at its lower rear surface and has top surface 51 to which flat housing plate 52 is bolted by screws 53. The housing plate 52 spans the main opening 54 and serves as a mounting for centrally located air cylinder 55 having a single piston rod 56 extending forwardly. Cylinder 55 is secured to the top of plate 52 by several screws 57. Immediately adjacent the front of cylinder 55 is a first guide block 58 extending across the width of the plate 52 and housing 27 and a similar second guide block 59 is located at the front end of the plate 52, the difference in the two blocks 58, 59 being that the first block 58 has a clearance hole 60 for piston rod 56. The blocks 58, 59 are held to plate 52 by a plurality of screws 61, extending from underneath and a mounting plate 62 is, in turn, secured to the upper surface of the blocks 58, 59. The mounting plate 62 serves as a mounting member for fastening the assembled presser member 20 to the bottom surface 63 of the main frame 64 by screws 65. Guide blocks 58, 59 have a pair of parallel guide rods 66 extending there between, one at each side of the assembly and a horizontal slider 67 rides with bushings 68 on guide rods 66. The threaded end 56a of piston rod 56 is received in slider 67 and affixed thereto by jam nut 56b.

The slider 67 has three specific positions:
1) fully-retracted, i.e. residing against the first guide block 58 as the piston rod 56 is fully-retracted into cylinder 55,
2) forwardly-advanced against latch finger 69 and
3) fully-advanced against the second guide block 59 (as the latch finger 69 is retracted).

The latch finger 69 slides in a vertical guide block 70 which is secured by screws 71 to the lower surface of the housing plate 52. The latch finger 69 extends through an aperture 72 in the plate 52 and is powered in the vertical direction by a compact fluid cylinder unit 73, secured to the bottom of the guide block 70.

The working unit (shoe plate stack 30) is comprised of a plurality of parallel-faced, wafer-like shoe plates 74, 75 stacked across the tape width and guided in slot 76 in the lower surface 77 of the housing 27. Shoe plates 74, 75 have a convex top edge 78 and a rounded bottom workpiece presser edge or nose 29. The two outer shoe plates 74 are twice as thick as the inner shoe plates 75 to provide side stiffness, but the outer shoe plates 74 are thinned-down at their bottom edge 29 to the same thickness as the inner shoe plates 75. The shoe plates 74, 75 are backed up by a brake block 79, situated in the housing 27, which serves as an additional guide for their rear edges 80, the brake block 79 being in line with the slot 76 in the housing 27. A vertical elongate slot 81, of common size, is in line through all the plates 74, 75 and a control rod 82 extends horizontally, from side-to-side through all of the slots 81. The control rod 82 is connected to a link 83 at each of the outer ends and the top of the links 83 are pivotally connected to the opposite side edges of the slider 67. In the position shown in FIG. 5: i.e. with the slider 67 stopped against the latch finger 69, the upper edges of the slots 81 will rest on the control rod 82 and the bottom edges 29 of the shoe plates 74, 75 will be in line as shown. This position is an alignment, or "null", position where the bottom edges 29 of the plates 74, 75 may thus be programmed in a known relation to the machine, in anticipation of a tape laying move.

In order to provide a downward biasing force to all of the plates 74, 75, a bladder spring 84 is provided comprising an open box frame 85, having a clearance around the periphery of the shoe plates 74, 75. A bifurcated lower portion not shown, of the box frame 85 extends downward around control rod 82 to act as a guide for control rod 82 and provide guidance for the overall width of the stack shoe plates 74, 75. The box frame 85 has a flexible membrane 86 extending across its entire upper surface, in contact with, and spanning the top edge 78 or biasing portion of the plates 74, 75. The membrane 86 is secured in place by a fabricated box 87, which is fully enclosed except for a single open side, which is placed against the membrane 86. The box 87 is secured in assembly with membrane 86, box frame 85 and housing 27 by screws, not shown, so that a closed chamber 88 is formed immediately above membrane 86. The box 87 is provided with an orifice 89 and a fluid conductive coupling 90, mounted therein, so that air or other fluid medium may be introduced into the chamber 88 and, thus, the membrane 86 pressurized to provide a downward biasing force to the entire stack of plates 74, 75. The membrane 86 is yieldable to accommodate surface contour variances which will cause plates 74, 75 to shift vertically, relative to one another, as the tape is laid.

It may be desired at certain instances to lock the plates 74, 75 of the shoe plate stack 30 in a particular contoured state, inhibiting further relative vertical movement between the plates 74, 75. For such instances, the brake block 79 has a slot 91 machined across its face adjacent the shoe plates 74, 75. A friction bar or brake pad 92, extends in the slot 91 across the rear edges 80 of the shoe plates 74, 75 and is activated by a compact fluid cylinder 93 which moves the brake pad 92 between "on" and "off" positions. The brake may be useful when the presser member 20 is operating near the edge of a mold and all the plates 74, 75 are not supported by a mold surface beneath the tape. In such instances the tape may be pushed over the edge of the mold in an unwanted fashion if shoe plates 74, 75 are not arrested.

In accordance with this invention, as embodied in FIG. 5, the presser member 20 is provided with a flexible skid member 26 fixed at one end to housing 27 by screws 28 so that it passes under and contacts nose 29 of plates 74, 75 of the shoe plate stack 30 and has a free end 31 coupled by T-strap 94 to a retractor comprising a torsion spring 95 engaging shaft 97 and engaging spool 96 rotationally mounted on the stationary shaft 97. The stationary shaft 97 is held at each end in frame 64 by screws 98. Strap 94 (e.g. a nylon strap) is locked onto spool 96 by pin 99 at one end and at the opposite end has a T configuration engaging a slot in the free end 31 of flexible skid member 26. The coupling of the flexible skid member 26 to the retractor can be accomplished by first passing the strap 94 through a slot in the free end 31 of the flexible skid member 26 until the T end of the strap 94 engages the slot in the free end 31, winding spool 96 in a direction so as to cause torsion spring 95 to exert a coiling force on spool 96 and then attaching the remaining end of strap 94 over pin 99 through a hole in the end of strap 94. The coiling force of torsion spring 95 must be adjusted, by the proper rotation of spool 96 and choice of spring 95, such that the flexible skid member 26 is biased against nose 29 of the plates 74, 75 of the shoe plate stack 30 with a force that does not restrict the working motions of the plates 74, 75 while at the same time both keeping the flexible skid member 26 against nose 29 and restricting or preventing longitudinal and transverse motions of skid member 26. In this preferred practice of this invention there is employed a flexible skid member comprising a laminated structure having a middle layer of silicone rubber and on opposite sides of the middle layer a layer of nylon cloth and a layer of high molecular weight polyolefin with the nylon layer facing and contacting nose 29 of the plates 74, 75. The coiling force of spring 95 maintains a force on the free end 31 of the flexible skid member 26 to keep skid member 26 from longitudinal and lateral movement, especially during the initiation of a line, layer or course of tape laying to thus prevent tape shift, tape bunching or other tape motions producing misalignment of the tape, voids, hard spots and delamination defects in the composite plastic tape molding.

A more detailed view of the preferred embodiment of the retractor of this invention shown in FIG. 5 is presented in FIG. 6 and in the sectional view in FIG. 7. In FIG. 6 torsion spring 95 is mounted on stationary shaft 97 to engage pin 100 in shaft 97 at one end and pin 101 in spool 96, rotationally mounted on shaft 97, at the other end such that when spool 96 is manually rotated in the appropriate direction a coiling or rotating force is placed on spool 96 by spring 95. Stationary shaft 97 is inserted into holes 64a in frame member 64 and is held in frame member 64 of the tape laying head by screws 98. Spool 96 is rotationally mounted on shaft 97 with a needle bearing 104 (see FIG. 7) and is held in position on shaft 97 by washers 102 and retaining rings 103. In the operation of the retractor, spool 96 is manually rotated against torsion spring 95 to wind spring 95 in a direction producing a coiling or rotating force against spool 96 in the opposite direction to which spool 96 was rotated and then strap 94 (FIG. 5) is attached to the spool 96 by pin 99 and to the free end 31 of the flexible skid member 26 via the T shaped end of strap 94 engaging a slot in the free end 31 of flexible skid 26. The coiling force on spool 96 is transmitted via strap 94 to the flexible skid member 26 (FIG. 5) biasing skid 26 against nose 29 of plates 74, 75 of shoe plate stack 30 (FIG. 5). The force at which skid 26 is biased against nose 29 must be sufficient to keep skid 26 against nose 29 without significantly inhibiting the vertical movement of plates 74, 75 of shoe plate stack 30 and at the same time restrict or prevent the undesired longitudinal and/or lateral movement of skid 26.

With reference to FIG. 8 there is presented a schematic view of an embodiment of this invention wherein the tape laying head, more particularly the presser member, shown in FIG. 5 is provided with a tail compactor of a type disclosed in U.S. Pat. No. 4,557,783, assigned to Cincinnati Milacron Inc., the disclosure of which is incorporated herein by reference, and there is shown a heater 105, not shown in but to be part of the embodiment shown in FIG. 5. The heater 105 is of the same type, function and operation as the heater 23 discussed in FIGS. 2, 3 and 4. The tail compactor 106 in FIG. 8, shown in a retracted or home position, has a roller 107 that engages and presses down the end or tail of a plastic tape strip, during the laying of the tape, when compactor 106 is swung down underneath of and clears the flexible skid 26 and nose 29 of shoe plate stack 30. To allow compactor 106 to swing down beneath and clear skid 26 and nose 29 the shoe plate stack 30 is vertically withdrawn into housing 27 out of contact with the plastic tape (not shown). As shoe plate stack 30 is vertically withdrawn from contact with the plastic tape the coiling force placed by spring 95 on spool 96 causes the flexible skid member 26 to follow the vertical movement of shoe plate stack 30 thereby keeping skid 26 in contact with nose 29. The coiling or rotating direction of spool 96 is shown by the arrow adjacent spool 96 and the coiled position of strap 94, when shoe plate stack 30 is in the vertically withdrawn position is shown in phantom on spool 96. The retracted or home position of tail compactor 106 is its usual position during the plastic tape laying operation except when it is employed to engage and press down the end or tail of a strip of plastic tape against the work surface or underlying layer of plastic tape. This action of the tail compactor 106 insures that the end of the laid strip of plastic tape is securely down against the work surface (e.g. mold surface) or underlying layer of plastic tape.

As used in this disclosure and claims the terms retractor and retractor means identify and are the same as means coupled to the floating end flexible skid member for applying a movement restricting force to said skid while biasing said skid against the tape engaging presser member in a manner permitting the working motions of the presser member, said means comprising a force generating means and a coupling means for engaging said skid. The terms floating end and free end are to be employed interchangeably herein and shall have the same meaning in respect to this invention.

This invention has been disclosed herein with respect to one, i.e. a preferred embodiment retractor structure and operation. Other retractor constructions to accomplish the advantageous results of this invention may be employed. Thus, for example, the spool in the preferred embodiment shown herein may remain stationary on the shaft and the shaft, equipped with a suitable spring, rotationally mounted on the frame members of the head so as to impart a coiling or rotational force to the spool. There may be employed as a retractor an extension spring adjustably coupled to the free end of the flexible skid member and to a frame member of the tape laying head such that a tension force of the extension spring on the flexible skid member, to bias it against the nose of a shoe for detruding plastic tape onto a work surface, may be suitably adjusted in accordance with the teachings herein. Other retractor means may be envisioned and devised by those skilled in the art to achieve the advantageous results of this invention without departing from the spirit and scope of this invention.

What is claimed is:

1. An improved machine for laying plastic tape on a work surface to produce a plastic article comprising
 a base structure located in a predetermined tape laying position relative to the work surface,
 a tape laying head means movably mounted on the base structure for applying the tape to the work surface,
 means for controlling the movement of said head means and
 a non-transportable flexible skid member interposed between said head means and the tape and immovably fixed at one end while having an unaffixed free end; wherein the improvement comprises a retractor means coupled to the unaffixed free end of said skid member for applying a lateral and longitudinal movement restraining force to said skid member.

2. An improved machine for laying plastic tape on a work surface to produce a plastic article comprising
 a base structure located in a predetermined tape laying position relative to the work surface,
 a tape laying head means movably mounted on the base structure for applying the tape to the work surface, said head means comprising a frame and a presser member comprising
 a presser member housing affixable to said frame,
 means for affixing the housing to the frame,
 a plurality of plates having flat parallel opposite faces stacked in adjacent face to face array and movably supported in the housing, said plates having a common workpiece presser edge extending from said housing and said plates each also having a biasing portion extending into said housing,
 means for independently guiding said plates in parallel movement with respect to said housing,
 bladder spring means in said housing for yieldably biasing said plates away from the housing including a fluid chamber and flexible membrane enclosing said chamber and extending into contact with the biasing portion of the plates and
 power means for controlling parallel movement of said plates at predetermined times,
 means for controlling the movement of said head means and a non-transportable flexible skid member interposed between said head means and the tape and immovably fixed at one end while having an unaffixed free end; wherein the improvement comprises a retractor means coupled to the unaffixed free end of the flexible skid member for applying a lateral and longitudinal movement restraining force to said skid member.

3. A machine according to claim 1 wherein the retractor means comprises
  a stationary shaft,
  a spool rotationally mounted on said shaft and
  a torsion spring mounted on said shaft while engaging said shaft and said spool for applying a rotational force to said spool.

4. A machine according to claim 2 wherein the retractor means comprises
  a stationary shaft,
  a spool rotationally mounted on said shaft and
  a torsion spring mounted on said shaft while engaging said shaft and said spool for applying a rotational force to said spool.

5. A machine according to claim 4 further comprising a strap coupled to said retractor means and said flexible skid member.

6. A machine for laying plastic tape on a work surface to produce a plastic article, comprising:
  a base structure, located in a predetermined position related to the work surface;
  head means for applying tape to the work surface, said head means being movably mounted on said base structure, said head means including shoe nose means for detruding said tape onto the work surface;
  means for moving said head means with respect to said work surface;
  a flexible skid member, having a first end affixed to said head means and having a second end, opposite said first end and movable with respect thereto, wherein said flexible skid member is interposed between said shoe nose means and said tape so as to contact said shoe nose means at a location between said first and second ends; and
  means for applying a tension force to the second end of said flexible skid member to thereby bias said flexible skid member against said shoe nose means.

7. The machine of claim 6, wherein said shoe nose means comprises a plurality of shoe segments movable with respect to one another.

* * * * *